United States Patent [19]

Komatsuzaki et al.

[11] Patent Number: 4,980,711
[45] Date of Patent: Dec. 25, 1990

[54] CAMERA WITH ZOOMING MECHANISM

[75] Inventors: Hiroshi Komatsuzaki, Tokyo; Nobuhiro Aoki, Saitama; Masaya Nozawa, Saitama; Syunji Nashimura, Saitama; Kazuhiro Akiyama, Saitama; Takao Koda, Saitama; Yasuhiko Tanaka, Saitama; Masao Shoji, Saitama, all of Japan

[73] Assignee: Fuji Photo Film Co., Ltd., Kanagawa, Japan

[21] Appl. No.: 431,148

[22] Filed: Nov. 3, 1989

[30] Foreign Application Priority Data

| Nov. 4, 1988 | [JP] | Japan | 63-278949 |
| Nov. 4, 1988 | [JP] | Japan | 63-278950 |
| Dec. 9, 1988 | [JP] | Japan | 63-159458[U] |
| Feb. 2, 1989 | [JP] | Japan | 1-24394 |
| Feb. 9, 1989 | [JP] | Japan | 1-30636 |

[51] Int. Cl.$^5$ .............................................. G03B 1/18
[52] U.S. Cl. .............................. 354/195.1; 354/195.12
[58] Field of Search ............ 354/195.1, 195.11, 195.12, 354/195.13, 202, 288, 400

[56] References Cited

U.S. PATENT DOCUMENTS

| 4,264,175 | 4/1981 | Hayata et al. | 354/195.12 |
| 4,799,073 | 1/1979 | Asano et al. | 354/195.12 |

Primary Examiner—L. T. Hix
Assistant Examiner—Khanh Dang
Attorney, Agent, or Firm—Young & Thompson

[57] ABSTRACT

A zoom lens system shifts the position of front and rear lens groups relative to each other in the direction of the optical axis to change its focal length, by moving a lens barrel back and forth in the axial direction. The lens barrel is formed with cutouts in its rear portion for receiving therein parts and elements projecting forwardly from the plane in which an exposure aperture is located when the lens barrel is retracted, so as to reduce the thickness of the camera with the retracted zoom lens. A focal length changing mechanism comprises a fixed cam and a lever attached to the lens barrel which is turned by the cam when the lens barrel moves back and forth to shift one lens group, thereby changing the focal length of the zoom lens to desired focal lengths. To correct the changes in focus of the zoom lens caused by the change of focal length, an adjusting member is provided in the focal length changing mechanism. An encoder is provided in the camera to detect the shifted axial positions of the lens barrel.

10 Claims, 13 Drawing Sheets

CAMERA WITH ZOOMING MECHANISM

BACKGROUND OF THE INVENTION

The present invention relates to a camera with a zooming mechanism.

Various kinds of automatic compact cameras, which have become very popular, are provided with an automatic film transporting feature and an automatic focusing feature. In recent years, certain kinds of such automatic compact cameras have even been provided with zoom lenses.

Zoom lenses are continuously variable in focal length. To vary the focal length of a zoom lens, a zooming mechanism includes a movable lens barrel holding therein a zoom lens system and a fixed lens barrel slidably receiving therein the movable lens barrel. When moving the movable lens barrel in an axial direction of the zoom lens system within the fixed lens barrel, the zoom lens system shifts its component lens groups following a predetermined relationship between the lens groups.

A camera body with a lens barrel fixedly mounted therein is usually provided with a driven sprocket which is driven by a film in the camera to control the advance of the film and to count exposures, and a drive sprocket which drives the film by a predetermined length immediately after the film is loaded and the back cover of the camera is closed. The provision of these sprockets makes the camera body bulky or thick. In an attempt to avoid such bulkiness or thickness of the camera, the rear ends of the outer and inner lens barrels should not overlie the sprockets.

However, locating the sprockets on one or both sides of the fixed or outer lens barrel increases the distance between the film supply chamber and the film take-up chamber of the camera, and as a result the camera is still bulky.

To change the focal length of the zoom lens system suitably for wide-angle photography, a rear lens group of the zoom lens system is moved toward a plane in which an exposure aperture is formed. Moreover, in collapsible-mount-type cameras, it is almost always necessary to move the rear lens group farther to the rear from the position wherein the zoom lens system has a focal length suitable for wide-angle photography. However, structure such as driving and driven sprockets projecting from the plane in which the exposure aperture is formed, prevents the rear lens group from moving back sufficiently and so it is still difficult to avoid bulkiness or undesirable thickness of the camera.

To reduce the thickness of the camera body, it has been proposed to reduce the size of the sprockets. However, a small diameter of driving sprocket is apt to break the perforations of the film.

Another problem with such a camera with a zoom lens is the structural strength of the zoom lens driving mechanism, which should be compact and should perform zooming operations with high accuracy. In particular, the zoom lens driving mechanism should allow fine adjustment of the focus of the zoom lens for any focal length upon assembling the zoom lens in the camera.

OBJECTS OF THE INVENTION

It is, therefore, an object of the present invention to provide a camera with a zoom lens, which camera is compact in size.

It is another object of the present invention to provide a camera with a zoom lens in which film drive and driven sprockets having ordinary diameters are used.

It is still another object of the present invention to provide a camera with a zoom lens which is provided with a zoom lens driving mechanism having improved structural strength.

It is yet another object of the present invention to provide a camera with a zoom lens in which tracking is easily effected.

It is a further object of the present invention to provide a camera with a zoom lens in which the position of a movable lens barrel can be detected with high accuracy.

SUMMARY OF THE INVENTION

The above objects of the present invention are achieved by providing a camera with a zoom lens having a zooming mechanism for shifting an inner lens barrel holding front and rear groups of lenses of a zoom lens system with respect to an outer lens barrel in the direction of the axis of the zoom lens system, thereby changing the relative positions of the front and rear groups of lenses so as continuously to vary the focal length of the zoom lens system. The camera has a camera body formed with a sprocket chamber which receives therein a sprocket wheel disposed along and close to one side of the exposure aperture and projecting forwardly from a plane in which an exposure aperture is formed. The outer and inner lens barrels are provided in their rear portions with cutouts for receiving the sprocket chamber when the inner and/or outer lens barrel is retracted. Owing to the provision of rear end cutouts in the inner and outer lens barrels, the camera with a zoom lens can be reduced in size, in particular in thickness and a relatively large diameter of sprocket can be used in the camera.

A guide rod is disposed along a side surface of part of the inner lens barrel where no cutout is formed, for guiding the axial movement of the inner lens barrel, so as to strengthen the structure of the zoom lens driving mechanism.

The inner lens barrel is operationally coupled to either of the front and rear groups of lenses by means of a lens shift mechanism including a lever pivotally mounted on the inner lens barrel. The lever has a cam follower pin which is in contact with a cam member attached to the outer lens barrel. When the inner lens barrel moves axially, the cam member turns the lever, thereby axially shifting either the front or the rear group of lenses axially so as to adjust the zoom lens system to the desired focal length. The cam member is rotatably mounted so as axially to shift either the front or the rear group of lenses. This movement of the cam plate enables easy adjustment of the focus of the zoom lens system for the extreme focal lengths of the zoom lens system.

DETAILED DESCRIPTION OF THE INVENTION

Referring to the drawings, in particular to FIGS. 1 to 4, a camera with a zoom lens is shown, comprising a camera body 1 provided with a film patrone receiving chamber or a film supply chamber 1a and a film take-up chamber 1b in which a film take-up spool is installed, these chambers 1a and 1b being disposed on opposite sides of, and interconnected by means of, an enclosed film passageway 1c. A substantially rectangular exposure aperture 1d is formed in a front wall 1h partly defining the film passageway 1c.

Figure 1:
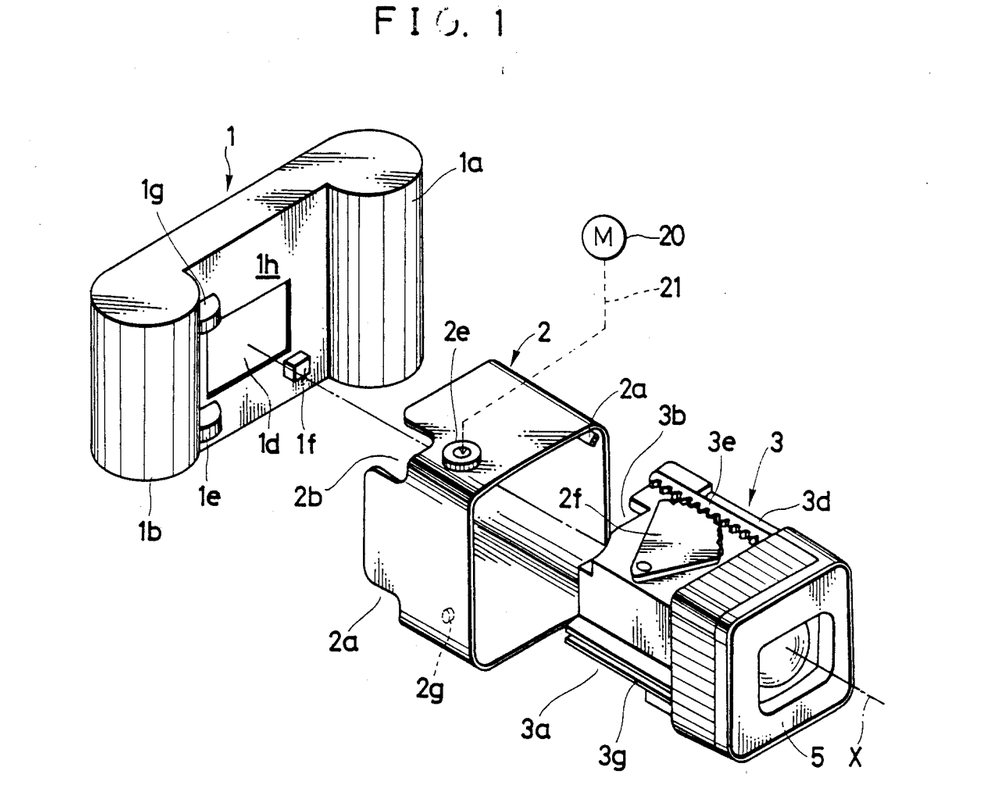
FIG. 1 is an exploded perspective view of a camera in accordance with a preferred embodiment of the present invention.

A drive sprocket chamber 1e, which projects forward from front wall 1h, is formed integrally with the front wall 1h below a lower corner of the exposure aperture 1d to accommodate therein a drive sprocket which drives a film so as automatically to position the first available frame of the film in an exposure position behind the exposure aperture 1d upon loading the film and closing a back door (not shown) of the camera body. A chamber 1f, which projects forward from the front wall 1h, is formed integrally with the front wall 1h below another lower corner of the exposure aperture 1d to accommodate therein a film metering wheel (not shown) which restrictively stops the film upon the first available frame of the film reaching the exposure position. A driven sprocket chamber 1g, which projects forward from the front wall 1h, is formed integrally with the front wall 1h above an upper corner of the exposure aperture 1d to accommodate therein a driven sprocket which is driven by the film so as automatically to position the next available frame of the film in the exposure position behind the exposure aperture 1d after making each exposure and to count the number of exposed frames.

An outer lens barrel 2, which is fixedly mounted on the front wall 1h of the camera body is formed with cutouts 2a and 2b in the rear periphery thereof. These cutouts 2a and 2b receive therein the drive and driven sprocket chambers 1e and 1g, respectively, upon barrel 2 being mounted on the front wall 1h of the camera body 1. The outer lens barrel 2 is moreover formed with another cutout in the rear periphery thereof so as to receive the chamber 1f.

The zoom lens system is, in this embodiment, comprised by two groups of front and rear lenses 5 and 6, which are mounted in a movable or inner lens barrel 3 so as to be shiftable relative to each other. The inner lens barrel 3 is snugly slidably fitted in the outer lens barrel 2 so as to move in the direction of the optical axis X of the zoom lens system. This axial movement of the inner lens barrel 3 causes the zoom lens system 5 to change the focal length of the zoom lens system. In more detail, when the inner lens barrel 3 moves in the outer lens barrel 2, the front and rear groups of lenses 5 and 6 mutually change in position in the inner lens barrel 3 following a predetermined positional relationship to vary the focal length of the zoom lens system.

The inner lens barrel 3, which is slidably received in the outer lens barrel 2, is formed with cutouts 3a and 3b in the rear periphery thereof. These cutouts 3a, 3b and 3c receive therein the drive and driven sprocket chambers 1e and 1g, respectively, upon being moved rearwardly close to the front wall 1h of the camera body 1. The inner lens barrel 3 is moreover formed with another cutout in the rear periphery thereof so as to receive the chamber 1f. The inner lens barrel 3 is provided with a guide rod 3d extending parallel to the optical axis X of the zoom lens system on one side of one side wall of which the rear periphery is formed with no cutout. The guide rod 3d is snugly slidably supported for lengthwise movement in and by a guide tube 2d secured to the inner wall of the outer lens barrel 2.

A rack 3e, which is provided on the upper surface of the inner lens barrel 3 along the guide rod 3d, is in mesh with a sector gear 2f coupled to a gear 2e. Rotation of a motor 20 is reduced by a gear train 21 connected to the gear 2e so as to axially move the inner lens barrel 3 through the sector gear 2f and rack 3e in mesh with each other, thereby changing the focal length of the zoom lens system. To smoothly guide the inner lens barrel 3, the outer lens barrel 2 is formed with a guide projection 2g formed on the inside of one side wall thereof which is slidable between guide rails 3g integrally formed with one side wall of the inner lens barrel 3. The guide rails 3g and the guide rod 3d are located symmetrically with respect to the axial centerline of the inner lens barrel 3. The symmetrical arrangement of the guide rails 3g and the guide rod 3d ensures the accurate axial movement of the inner lens barrel 3.

Figure 2:
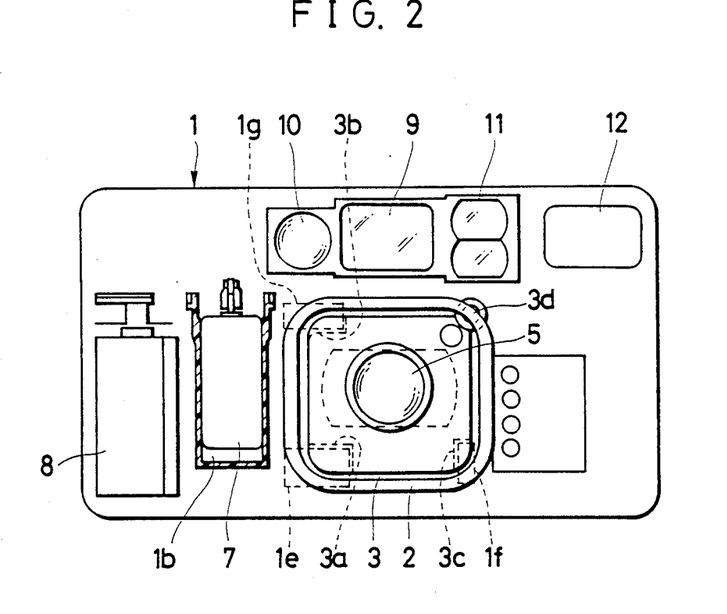
FIG. 2 is a front view of the camera shown in FIG. 1.

As shown in FIG. 2, a battery chamber 8 is provided in the camera body 1 between the film take-up chamber 1b and the exposure aperture 1d. The camera body 1 is moreover provided with a finder system 9 directly above the outer lens barrel 2, an automatic light measuring system including light detecting element 10 on one side of the finder system 9, an automatic focusing optical system including light-emitting and light-receiving elements 11 on the other side of the finder system 9, and an automatic electronic flash system including a diffusion glass 12 adjacent to the light-emitting and light-receiving elements 11.

Figure 4:
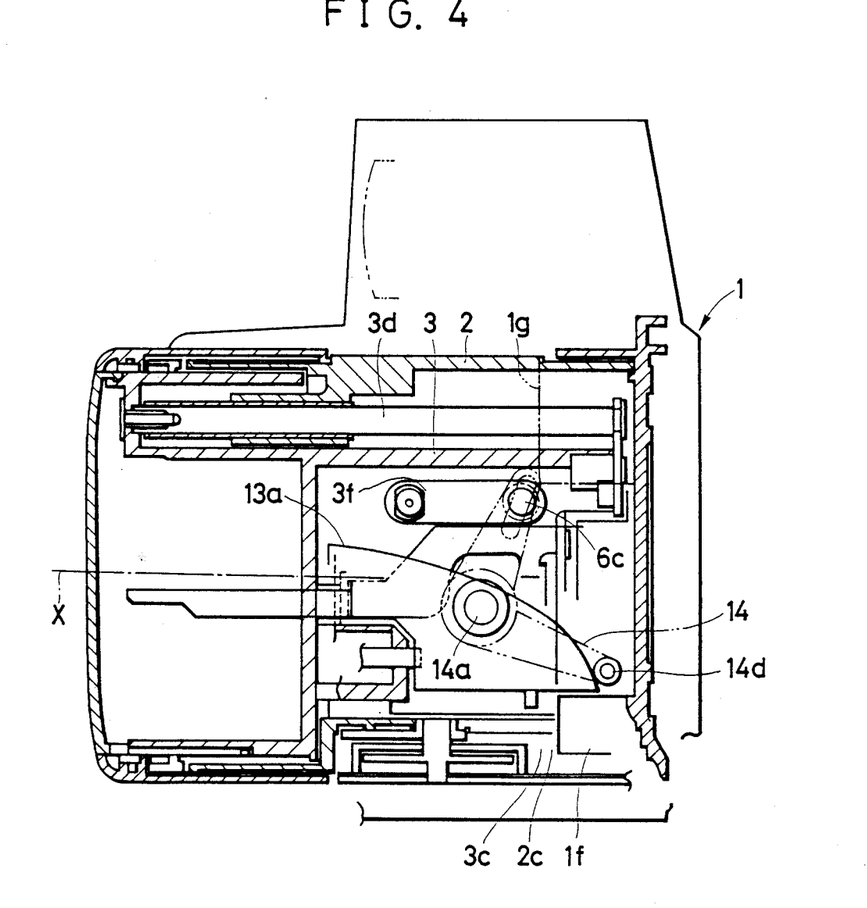
FIG. 4 is a cross-sectional view of the camera shown in FIG. 1.
Figure 5:
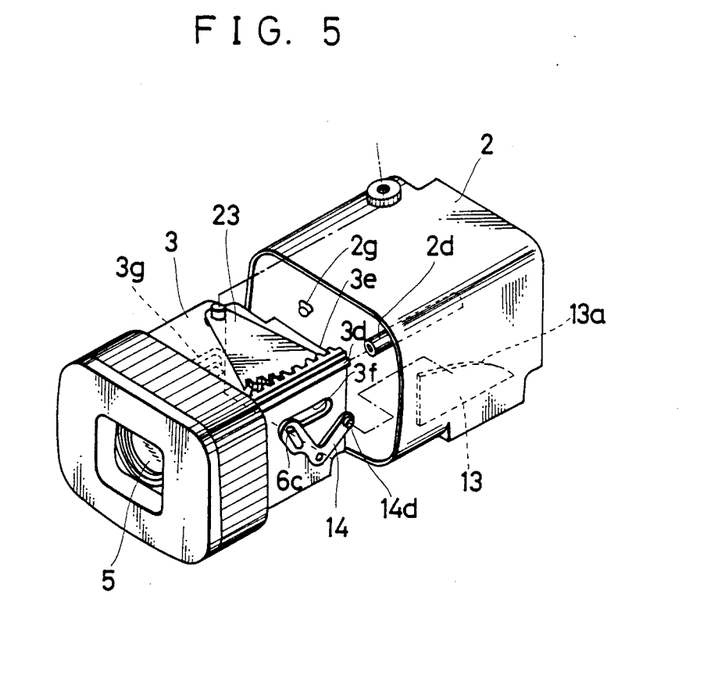
FIG. 5 is an exploded perspective view of a zoom lens in accordance with another preferred embodiment of the present invention.

As is apparent from FIGS. 4 and 5, the outer and inner lens barrels 2 and 3 are provided with a cam plate 13 therebetween formed with a cam 13a, plate 13 being secured to an inside wall of the outer lens barrel 2, and a bell crank lever 14 pivotally mounted on a shaft 14a. The bell crank lever 14 has a cam follower pin 14d in contact with the cam 13a of the cam plate 13 rotatably mounted on one end thereof and is formed with a slot 14b (FIGS. 6A and 6B) receiving a connecting pin 6c secured to the lens holder 6a holding the rear group of lenses 6. The connecting pin 6c protrudes outside the inner lens barrel 3 passing through a slot 3f forme din the side wall of the inner lens barrel 3 so as to engage the slot 4b of the bell crank lever 14.

Figure 3:
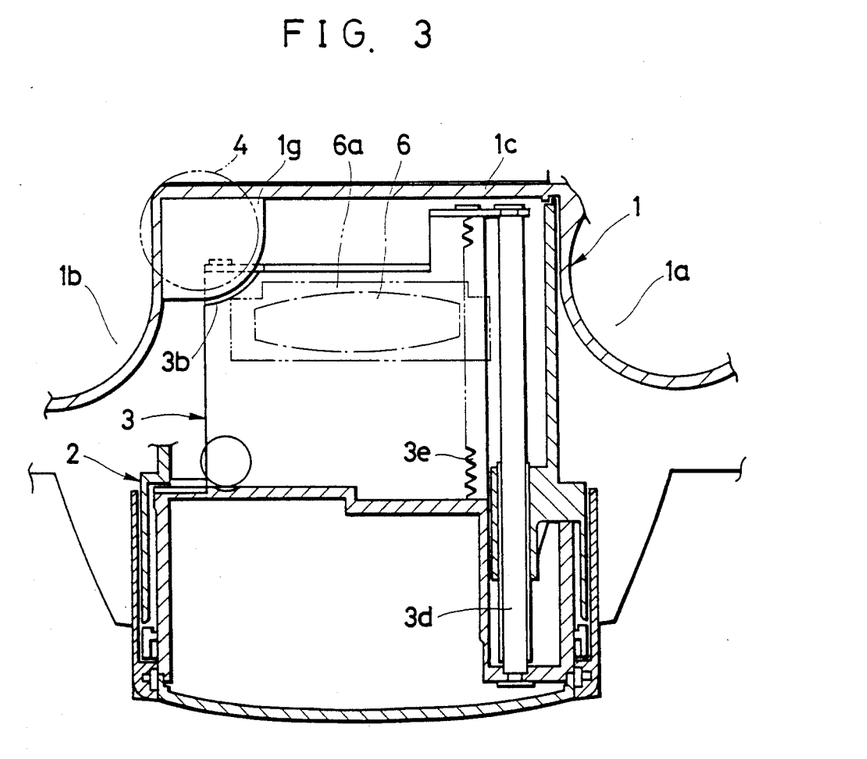
FIG. 3 is a partial sectional view of the camera shown in FIG. 1.

In the wide angle photography position as shown in FIGS. 3 and 4 wherein the inner lens barrel 3 is moved back to its extreme rear position, the cutouts 2b and 3b of the outer and inner lens barrels 2 and 3 receive the driven sprocket chamber 1g and the rear group of lenses 6 is located at its extreme rear position and partly overlaps the driven sprocket chamber 1g. The chamber 1f is received in the cutouts 2c and 3c of the outer and inner lens barrels 2 and 3. Although hidden, the drive sprocket chamber 1e is received in the cutouts 2a and 3a of the outer and inner lens barrels 2 and 3.

As is apparent from FIGS. 3 and 4, because there is no projection, such as the drive and driven sprocket chambers 2e and 1g projecting from the front wall 1h of the camera body 1, facing the rear end of the guide rod 3d, the guide rod 3d can be sufficiently long to reach the front wall 1h of the camera body 1.

The motor 20 is actuated to rotate so as to change the focal length of the zoom lens system which in the illustrated position is suitable for wide angle photography. As a result of rotation of the motor 20, the gear 2e is turned to move the inner lens barrel 3 axially forwardly through the engagement of the rack 3e and pinion 2f with the bell crank lever 14 being turned in the counter-clockwise direction as viewed in FIG. 4 through the sliding contact of the cam follower 14b with the cam periphery 13a of the cam plate 13, thereby moving the lens holder holding the rear group of lenses 6 forwardly relative to the inner lens barrel 3 so as to approach the front group of lenses 5. Thus, the cam plate 13 and the bell crank lever 14 change the focal length of the zoom lens system to any desired focal length, between their extreme positions.

Because of cutouts 2a, 2b and 3a, 3b formed in the outer lens barrel 2 and the inner lens barrel 3, respectively, which prevent the chambers 1e-1g projecting forwardly from the front wall 1h of the camera body 1 from interrupting the backward movement of the outer and/or inner lens barrel 2, 3 close to the front wall 1h, the zoom lens system can not only be made variable in focal length over a wide range but also make the camera compact and thin. Furthermore, it is not necessary to make the sprocket chambers 1e and 1g small, thereby making it possible to incorporate large diameters of drive and driven sprockets so as to prevent the drive and driven sprockets from breaking the film perforations.

Figure 6A:
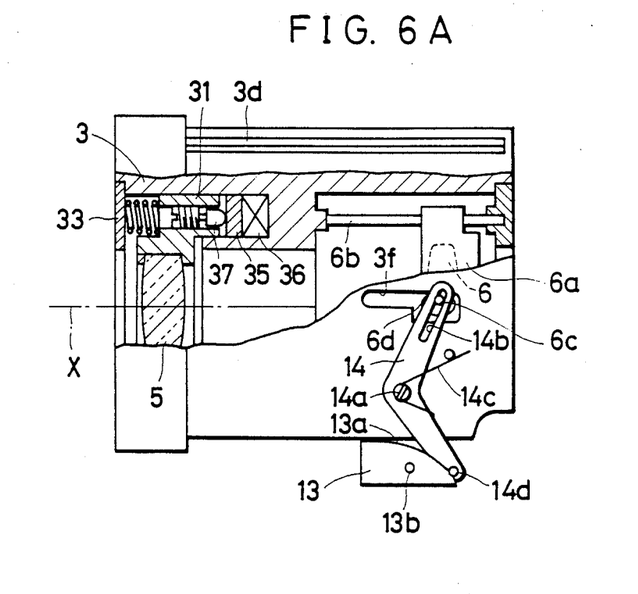
FIG. 6A is a side view, partially in section, of the zoom lens shown in FIG. 5.

Referring to FIGS. 5 and 6A, a zoom lens driving mechanism incorporated in the camera shown in FIG. 1 is shown in more detail. The sector gear 23, which is disposed inside the outer lens barrel 2, is fixedly connected to the gear 2e by means of a shaft secured to the sector gear 23. As was previously described, the sector gear 23 is in mesh with the rack 3e of the inner lens barrel 3. When the sector gear 23 is turned in one direction by means of the motor 20 through the gear train 21 and the gear 2e, the inner lens barrel 3 is axially shifted back or forth. Because of the sector gear 23 and the bell crank lever 14 located on opposite sides of the guide rod 3d, the relative position between the inner lens barrel 3 and the cam plate 13 secured to the outer lens barrel 2 is kept unchanged even when the inner lens barrel 3 protrudes and receives a strong external force, so that the zoom lens system can vary in focal length over its whole range with high accuracy.

The front group of lenses 5 is held by a lens holder 31 (FIG. 6A) which is slidably received in the inner lens barrel 3 for axial movement. To move the front group of lenses 5 independently of the rear group of lens 6, the inner lens barrel 3 is provided with a stepping motor 36 and an annular face cam 35 incorporated therein. A coil spring is disposed between a front ring 33 and the front lens holder 31 to force the front lens holder 31 axially rearwardly. The front lens holder 31 is provided with a cam follower pin 37 urged against the face cam 35 by the coil spring. The cam follower pin 37 is screwed into the front lens holder 31 so as to be adjustable in axial position. The stepping motor 36 is actuated and controlled by a focusing signal provided from an automatic focusing unit (not shown), thereby turning the surface cam 35 so as to move the front lens holder 31 axially back or forth for focusing. Various types of automatic focusing units are well known and any type of automatic focusing unit may be incorporated in the camera.

Figure 6B:
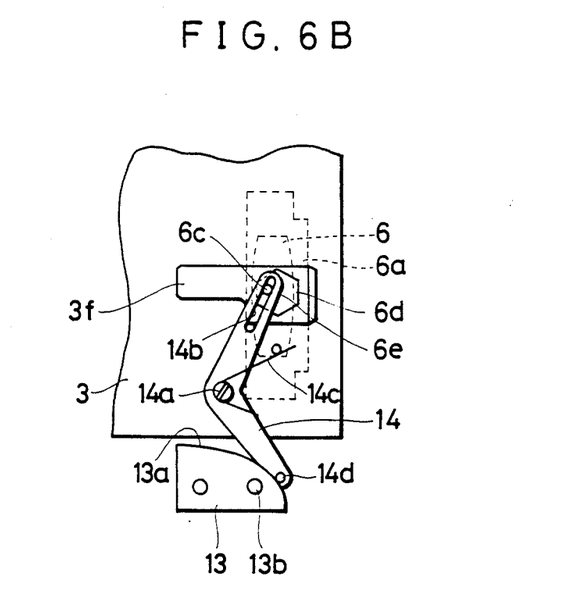
FIG. 6B is an explanatory illustration of a cam mechanism of the zoom lens shown in FIG. 5.

The zoom lens driving mechanism incorporates a tracking mechanism as shown in FIG. 6B which is used to adjust the axial position of the rear group of lenses 6 with respect to the cam 13a of the cam plate 13 in mounting the zoom lens on the camera body 1. The bell crank lever 14 is formed with the slot 14b in an arm opposite to an arm having a cam follower pin 14d with respect to the shaft 14a. The slot 14b receives the connecting pin 6c eccentrically mounted on an adjusting member 6d pivotally mounted on a mounting pin 6e secured to the lens holder for the rear group of lenses 6. In any axial position of the rear group of lenses 6, the zoom lens system should form a sharply focused image in an image plane of the camera body 1. For adjusting the zoom lens system so as to form a sharply focused image at any focal length, a tracking operation is effected upon assembling the zoom lens to the camera body. That is, the relative distance between the front and rear groups of lenses 5 and 6 of the zoom lens system is adjusted so as to form a sharply focused image for the focal lengths suitable for telephotography and wide-angle photography. For this adjustment, after shifting the inner lens barrel 3 to its one extreme to set the focal length suitably for wide-angle photography, the front group of lens 5 is adjusted in position. Thereafter, the inner lens barrel 3 is shifted to its other extreme to set the focal length suitably for telephotography and then the adjusting member 6d is turned about a mounting pin 6e, thereby shifting the rear group of lens 6 back or forth so as to form a sharply focused image. Thereafter, the adjusting member 6d is fixed in this adjusted position with an adhesive or the like.

In the tracking operation described above, the relative position between the front and rear groups of lenses 5 and 6 changes upon shifting the rear group of lenses 6 to the telephotographic extreme. Accordingly, to adjust the zoom lens system with high accuracy, after adjusting the rear group of lenses 6 at the telephotographic extreme, the inner lens barrel 3 should be shifted to the wide-angle photography extreme, and there the front group of lenses 5 is again adjusted in position so as to form a sharply focused image. This adjustment is necessarily repeated several times for the front and rear groups of lenses 5 and 6 until the zoom lens system forms a sharply focused image at any focal length.

Figure 7:
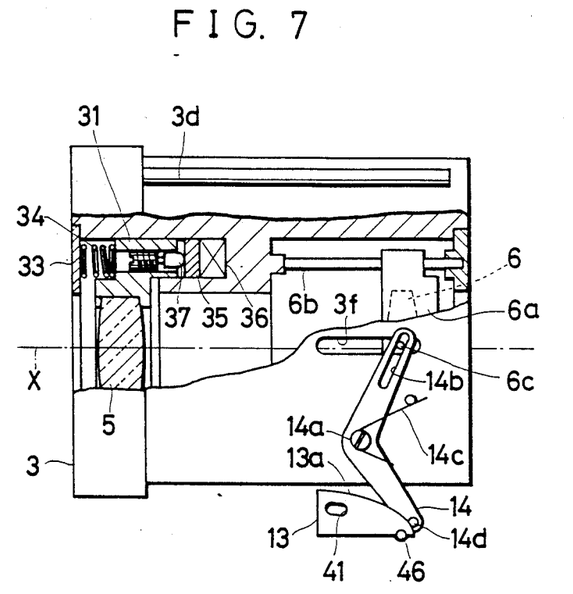
FIG. 7 is a side view, partially in section, of a zoom lens in accordance with another preferred embodiment of the present invention.
Figure 8:
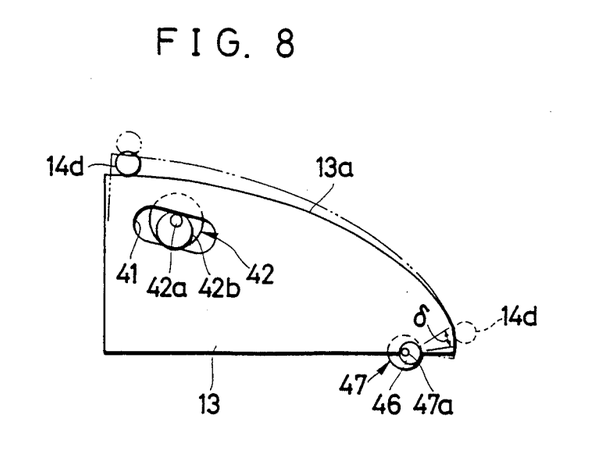
FIG. 8 is an explanatory illustration of a cam member of the zoom lens shown in FIG. 7.

To simplify the tracking operation, an improved tracking mechanism is provided in a camera shown in FIG. 7. The cam plate 13, as shown in detail in FIG. 8, is formed with a slot 41 inclined relative to the axis X of the zoom lens system. The slot 41 rotatably receives an offset flange 42b formed integrally with an adjusting pin 42. The adjusting pin 42 is pivotally secured to the outer lens barrel 2 by means of a mounting pin 42a on the axial centerline of rotation of the adjusting pin 42.

The cam plate 13 is mounted on an offset flange 46 for pivotal movement. The cam 13a of the cam plate 13 has an extreme cam portion formed at the end of the wide-angle photographic cam portion as a circular arc which has its center on the axial centerline of rotation of the cam plate 13 and which subtends an angle of δ degrees. The offset flange 46 is formed integrally with adjusting pin 47 rotatable about the mounting pin 47a pivotally secured to the outer lens barrel 2.

In tracking the zoom lens system, the inner lens barrel 3 is axially shifted to the wide-angle extreme position shown in FIG. 7. In the wide-angle extreme position, the cam follower pin 14d of the bell crank lever 14 is brought into contact with the wide-angle photographic cam portion of the cam 13a of the cam plate 13 so as to place the rear group of lenses 6 in position for wide-angle photography. Then, the front group of lenses 5 is finely adjusted as to its axial position by adjusting the cam follower pin 37 as to its axial position so that the zoom lens system forms a sharply focused image. Instead of adjusting the cam follower pin 37, it is permissible to adjust the front group of lenses 5 as to its axial position with respect to the front lens holder 31.

After the adjustment of the front group of lenses 5 in the wide-angle photographic extreme position, the inner lens barrel 3 is extended to the extreme telephotographic position for adjusting the zoom lens system for telephotography. For this adjustment, the adjusting pin 42 is turned about the mounting pin 42a so as to turn the cam plate 13 about the offset flange 46 of the adjusting pin 47. For example, turning the adjusting pin 42 fully once, the cam plate 13 is shifted between its two extreme positions, namely, the dotted line position and the full line position shown in FIG. 8. When the cam plate 13 is turned in the clockwise direction as viewed in FIG. 8, the cam follower pin 14d is displaced upward, thereby turning the bell crank lever 14 in the counterclockwise direction so as to shift forwardly the rear group of lenses 6. If it is needed to shift backwardly the rear group of lenses 6, the cam plate 13 should be turned in the counterclockwise direction.

If the cam plate 13 is turned through an angle less than δ degrees, the extreme circular arcuate cam portion of the cam 13a causes no positional change, and the rear lens group of lenses 6 never changes in axial position or returns to its former adjusted axial position even when the inner lens barrel 3 is returned or collapsed to provide a focal length suitable for wide-angle photography. Accordingly, by adjusting the rear group of lenses 6 first and then the front group of lens 5 only once, the relative position of the front and rear groups of lenses 5 and 6 is accurately adjusted for both of the focal lengths suitable for wide-angle photography and telephotography.

By virtue of the offset between the flange 46 of the adjusting pin 47 as a shaft about which the cam plate 13 turns and the axial centerline of rotation of the mounting pin 47a of the adjusting pin 47, the adjustment of focus of the zoom lens to a focal length suitable for wide-angle photography can be made by adjusting the rear lens group of lenses 6 as to its axial position. That is, the cam plate 13 can be shifted in the direction X of the optical axis of the zoom lens system by turning the adjusting pin 47 about the mounting pin 47a for the adjustment of focus of the zoom lens system for the focal length suitable for wide-angle photography. The axial shift of the cam plate 13 causes the change of axial position of the rear group of lens 6 through the cam follower pin 14d, the bell crank lever 14 and the connecting pin 6c, thereby adjusting the axial position of the rear group of lenses 6 relative to the front group of lenses 5. For the focal length of the zoom lens system suitable for telephotography, the adjusting pin 42 is turned so as to turn the cam plate 13 about the offset flange 46. In this case, if the angle through which the cam plate 13 is turned is less than δ degrees, the extreme circular arcuate cam portion of the cam 13a causes no positional change, the rear lens group of lenses 6 never changes in axial position or returns to its former adjusted axial position even when the inner lens barrel 3 is returned or collapsed to provide a focal length suitable for wide-angle photography.

As will be apparent from the above description, according to the zoom lens driving mechanism shown in FIGS. 7 and 8, the tracking operation of the zoom lens system is performed by adjusting the front and rear group lenses 5 and 6 only once. It is permissible to locate the adjusting pin 47 having the offset flange 46 below the telephotographic cam portion of the cam 13a and form an extreme cam portion as a circular arc which has its center on the axial centerline of rotation of the cam plate 13 and which subtends an angle of δ degrees, at the end of the wide-angle photographic cam portion.

Figure 9:
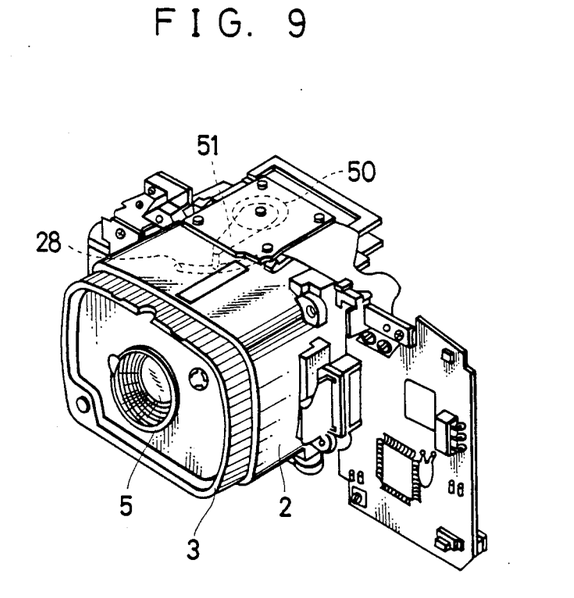
FIG. 9 is an exploded perspective view of a zoom lens in accordance with still another preferred embodiment of the present invention.
Figure 10:
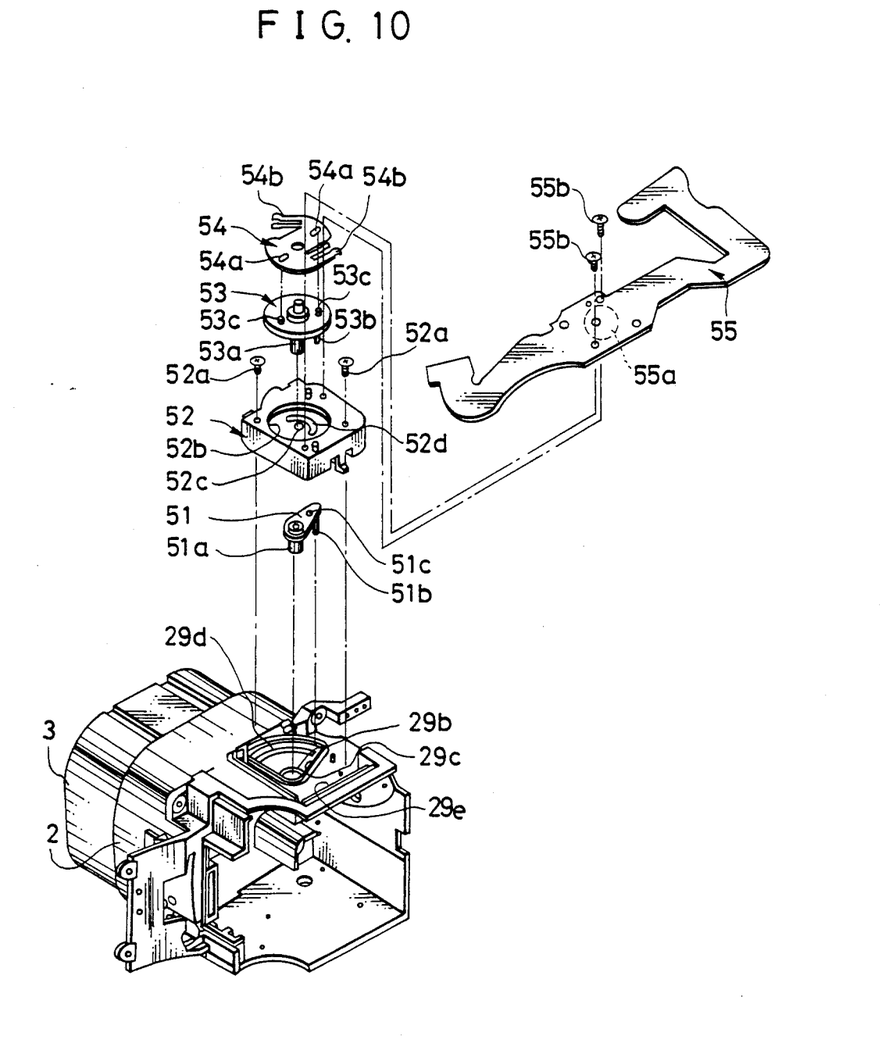
FIG. 10 is an exploded perspective view of an encoder incorporated in the zoom lens shown in FIG. 9.
Figure 11:
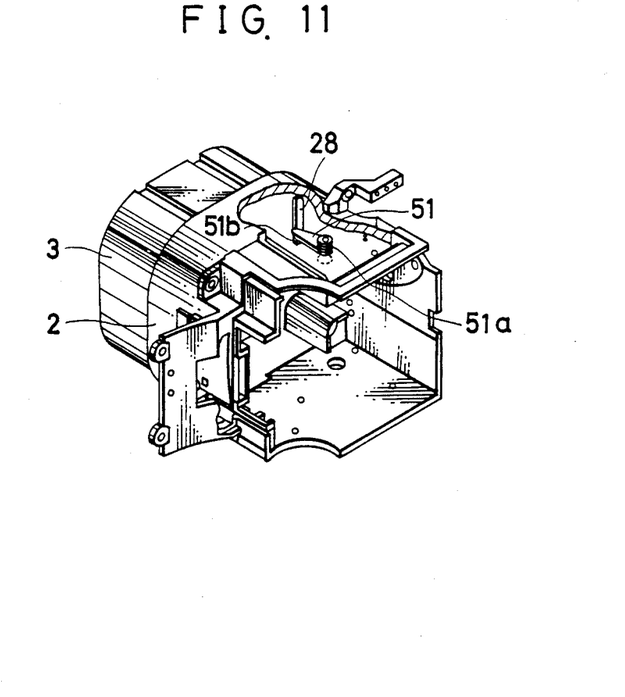
FIG. 11 is a perspective rear view of the zoom lens shown in FIG. 9.

Referring to FIGS. 9-11, a camera with an encoder driving mechanism is shown, consisting of the fixed or outer lens barrel 2 and the movable or inner lens barrel 3 holding the zoom lens system comprising the front and rear groups of lenses 5 and 6 which are changeable in relative axial position within the inner lens barrel 3.

An encoder 50, which is disposed on the top wall of the outer lens barrel 2, has a driving lever 51 which is moved by a cam groove 28 formed in the upper surface of the top wall of the outer lens barrel 3.

The encoder 50, as is shown in detail in FIG. 10, comprises the driving lever 51, an encoder case 52, a rotor 53, a sliding contact 54 and a flexible printed plate 55. The driving lever 51 is received in a generally sector-shaped recess 29c formed in the top wall of the outer lens barrel 2 and pivotally mounted for swinging movement in the recess 29c by an integral connecting pin 51a pivotally fitted in a hole 29b formed in the recess 29c of the top wall of the outer lens barrel 2. The driving lever 51 is provided with a cam follower pin 51b extending downwardly from the free end thereof. The cam follower pin 51b slidably passes through a circular arcuate slot 29b formed in the recess 29c and is further slidably received in the cam groove 28 in the top wall of the inner lens barrel 3. The cam groove 28 is so formed as to turn the driving lever 51 through an angle which is larger in the range of focal length suitable for telephotography than in the range of focal length suitable for wide-angle photography. By means of the engagement of the cam follower pin 51b with the cam groove 28 of the inner lens barrel 3, the driving lever 50 is forced to turn when the inner lens barrel 3 is axially shifted.

The encoder case 52, which is attached to the top wall of the inner lens barrel 3 in the recess 29c by set screws 52a, is formed with a circular recess 52b in the upper surface thereof in which the rotor 53 is received. The rotor 53 has a shaft 53a which is fitted in a hole 52c formed in the encoder case 52 so as to allow rotation of the rotor 53 in the circular recess 52b of the encoder case 52. The rotor 53 is provided with a pin 53b extending from the lower surface thereof which passes through a circular arcuate slot 52d formed in the encoder case 52 and is received in a hole 51c formed in the driving lever 51. When the driving lever 51 rotates about the connecting pin 51a, the rotor 53 is forced to turn about the shaft 53a through the connection between the driving lever 51 and the pin 53b.

The rotor 53 is attached to the sliding contact 54 which is formed with two holes 54a and elastic contact arms 54b. The holes 54a receive pins 53c provided on the rotor 53, respectively, thereby coupling the rotor 53 and the sliding contact 54 together. The contact arms 53b are in contact with a patterned conducting member 55a printed on the back surface of the flexible printed plate 55. The printed plate 55 is secured to the top wall of the outer lens barrel 2 by set screws 55b. Both ends of the printed plate 55 are connected to a circuit board (not shown).

When the inner lens barrel 3 moves back and forth, the driving lever 51 of the encoder 50, and hence the rotor 53 integrally fixed to the driving lever 51, is turned through the engagement of the cam follower pin 51b and the cam groove 28. Accordingly, the sliding contact 54 slides on the patterned conducting member 55a printed on the back surface of the flexible printed plate 55. Thus, corresponding axial positions of the inner lens barrel 3 can be detected, based on the angular positions of the sliding contact 54 on the patterned conducting member 55a. Because the cam groove 28 is so formed as to turn the driving lever 51 through an angle which is larger in the range of focal length suitable for telephotography than in the range of focal length suitable for wide-angle photography, the axial position of inner lens barrel 3 can be detected with a high accuracy even in the range of focal length suitable for wide-angle photography.

Figure 12:
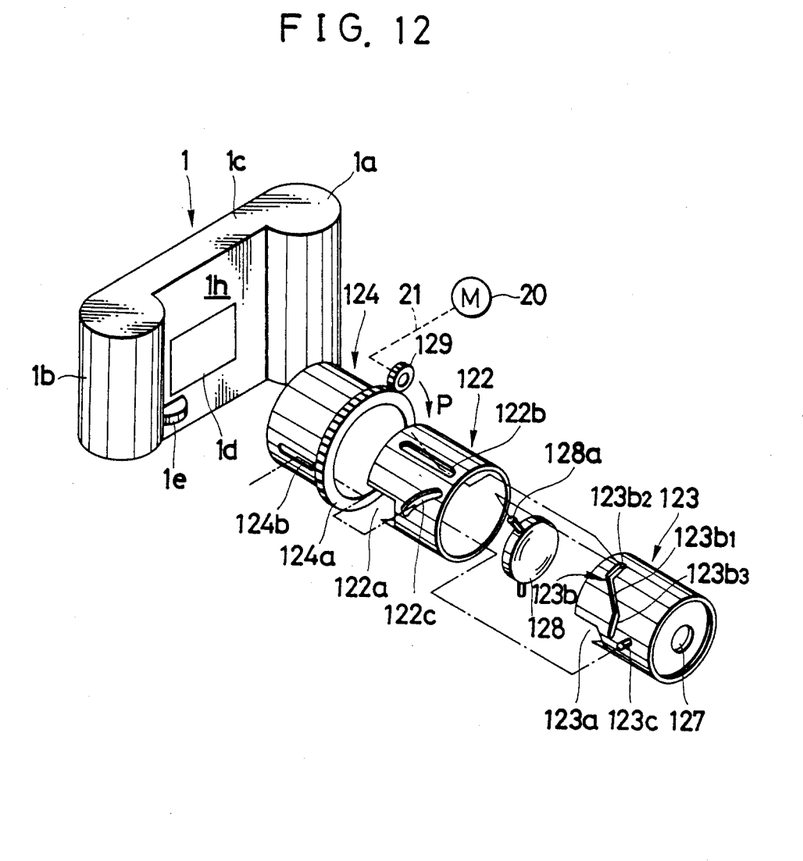
FIG. 12 is an exploded perspective view of a camera in accordance with a further preferred embodiment of the present invention.
Figure 13:
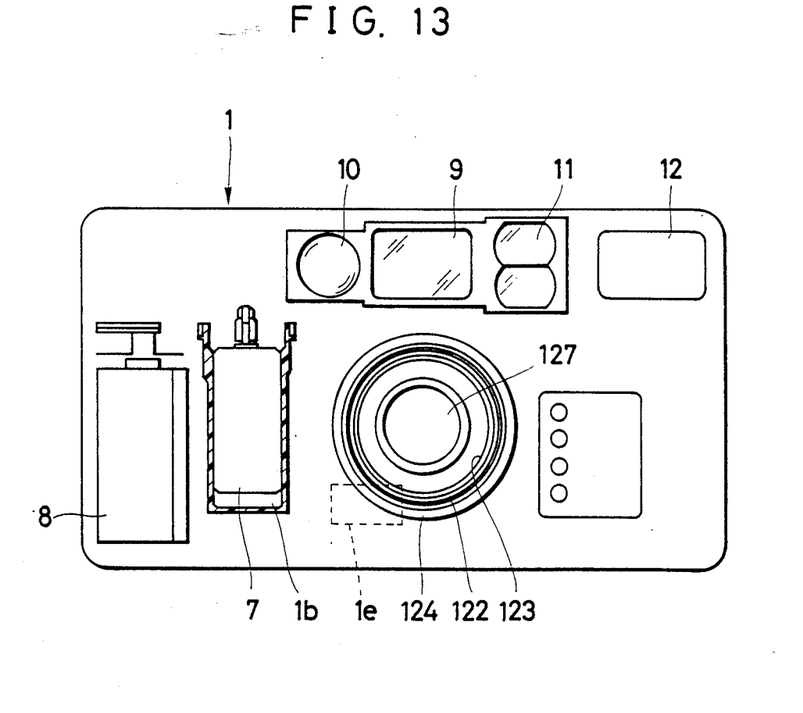
FIG. 13 is a front view of the camera shown in FIG. 12.
Figure 14:
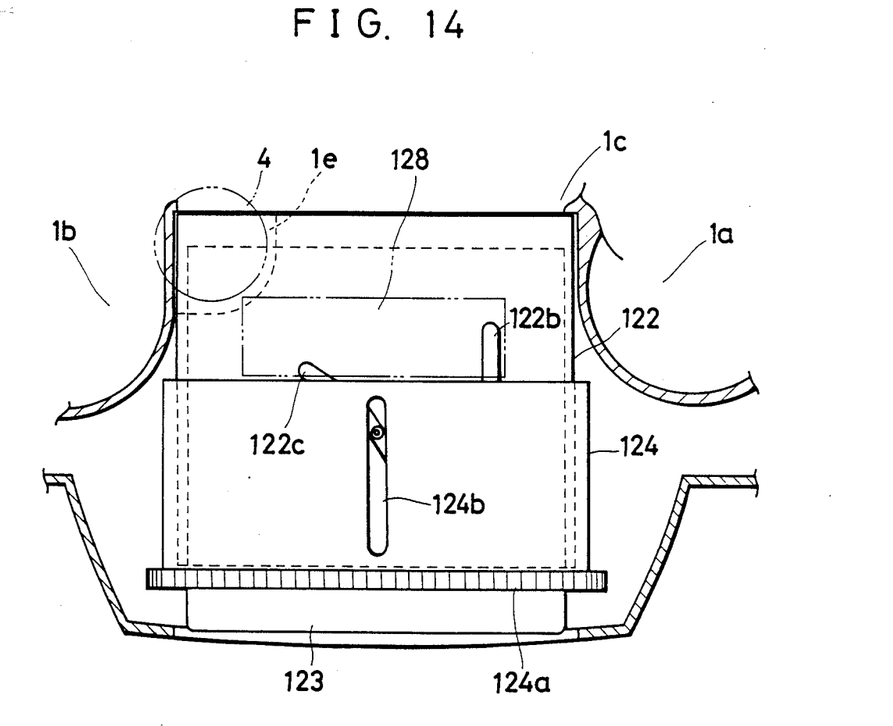
FIG. 14 is a partial sectional view of the camera shown in FIG. 12.

Referring to FIGS. 12-14, a camera in accordance with another preferred embodiment of the present invention is shown, provided with a zoom lens different from the zoom lens shown in FIG. 1. The zoom lens consists of three cylindrical barrels, namely a fixed or outer lens barrel 122, a movable or inner lens barrel 123 and an operating barrel 124. The outer lens barrel 122, which is fixedly mounted on the front wall 1h of the camera body 1, is formed with a cutout 122a in a rear periphery thereof for receiving the drive sprocket chamber 1e upon being mounted on the front wall 1h of the camera body 1. The outer lens barrel 122 is moreover formed with an axially extending cam slot 122b and a curved cam slot 122c which is inclined relative to the axial centerline of barrel 122.

A zoom lens system is, in this embodiment, comprised by two groups of lenses, namely a front group of lenses 127 fixedly held and rear group of lenses 128 movably held, in the inner lens barrel 123 so as to be shiftable relative to each other. The inner lens barrel 123 is snugly fitted in the outer lens barrel 122 so as to move back and forth in the direction of the optical axis of the zoom lens system and to rotate about the optical axis of the zoom lens system within the outer lens barrel 122. This axial and rotatable movement of the inner lens barrel 123 causes the zoom lens system to change the focal length thereof. The inner lens barrel 122 is formed with a cutout 123a in the rear periphery thereof for receiving the drive sprocket chamber 1e upon being moved rearwardly close to the front wall 1h of the camera body 1. The inner lens barrel 123 is moreover formed with a lens shifting cam slot 123b which consists of a control cam slot section 123b1 inclined relative to the axial centerline thereof and end guide cam slot sections 123b2 and 123b3 which are perpendicular to the axial centerline of barrel 123 and are interconnected by the control cam slot section 123b1. The inner lens barrel 123 is provided with a cam follower pin 123c extending radially therefrom.

The operating barrel 124, which is snugly mounted on the outer lens barrel 122 so as to rotate relative to the outer lens barrel 122 and is axially movable relative to the inner lens barrel 123, is formed with gear teeth 124a on the front periphery thereof and an axially extending cam slot 124b. Rotation of a motor 20 is reduced by a gear train 21 connected to a gear 129 in mesh with the gear teeth 124a so as to rotate the operating barrel 124. The cam follower pin 123c of the inner lens barrel 123 is slidably received in the curved cam slot 122c of the outer lens barrel 122 and the axially extending cam slot 124b of the operating barrel 124.

The rear group of lenses 128 of the zoom lens system has a radially extending pin 128a which is slidably received in the lens shifting cam slot 123b of the inner lens barrel 123 and axially extending cam slot 122b of the outer lens barrel 122.

The zoom lens system shown in FIG. 14 is in a position suitable for wide-angle photography wherein the inner lens barrel 123 is moved back to its extreme rear position, the cutouts 122a and 123a of the outer and inner lens barrels 122 and 123 receive the drive sprocket chamber 13 and the rear group of lenses 128 is located at its extreme rear position and partly overlaps the drive sprocket chamber 1e. When the motor 20 is actuated to rotate so as to change the focal length of the zoom lens system from one suitable for wide-angle photography, the gear 129 in mesh with the gear teeth 124a is turned in the clockwise direction shown by an arrow P in FIG. 12, thereby rotating the operating barrel 124 about the axis of the zoom lens system so as to move forwardly the inner lens barrel 123 while rotating it about the axis of the zoom lens system through the engagement of the cam follower pin 123c and the cam slots 122c and 124b of the outer lens barrel 122 and the operating barrel 124.

As the inner lens barrel 123 moves forwardly, the rear group of lenses 128 whose radially extending pin 128a is received in the axially extending cam slot 122b of the outer lens barrel 122 and the lens shift cam slot 123b of the inner lens barrel 123 is shifted axially forwardly within the inner lens barrel 123 without being rotated. In this manner, rotation of the operating barrel 124 causes changes in the relative positions of the front and rear groups of lenses 127 and 128, thereby changing the focal length of the zoom lens system.

Although the present invention has been fully described by way of preferred embodiments thereof with reference to the accompanying drawings, it is to be noted that various changes and modifications will be apparent to those skilled in the art. Therefore, unless otherwise these changes and modifications depart from the scope of the present invention, they should be construed as being included therein.

What is claimed is:

1. A camera with a zooming mechanism for shifting an inner lens barrel holding front and rear lens means of a zoom lens system with respect to a fixed outer lens barrel in the direction of the optical axis of the zoom lens system and for changing the relative positions of the front and rear lens means so as continuously to vary the focal length of the zoom lens system, the camera comprising:

a camera body formed with a sprocket chamber for receiving therein a sprocket wheel for engaging a film within said camera body, said sprocket chamber being disposed adjacent an exposure aperture in said camera body and projecting forwardly from a plane in which said exposure aperture is formed;

a cutout formed in a rear portion of said outer lens barrel, said cutout receiving said sprocket chamber; and a cutout formed in a rear portion of said inner lens barrel for receiving said sprocket chamber when said inner lens barrel is in a rearmost position.

2. A camera as defined in claim 1, further comprising a guide rod disposed along a side surface of part of said inner lens barrel where no cutout is formed for guiding axial movement of said inner lens barrel.

3. A camera as defined in claim 1, wherein said inner lens barrel is operationally coupled to one of said front and rear lens means by a lens shifting mechanism including a lever pivotally mounted on said inner lens barrel, said lever having a cam follower pin which is in contact with a cam attached to said outer lens barrel, said cam being capable of turning said lever to shift axially said one of said front and rear lens means so as to adjust said zoom lens system to a desired focal length when said inner lens barrel moves in said axial direction.

4. A camera as defined in claim 3, wherein said cam is rotatably mounted on said outer lens barrel so as to shift axially said one of said front and rear lens means, thereby to adjust the focus of said zoom lens system.

5. A camera as defined in claim 3, wherein said cam includes a cam portion at one end thereof which causes no axial shifting of said one of said front and rear lens means.

6. A camera as defined in claim 1, further comprising an encoder for detecting the axial position of said inner lens barrel, said encoder comprising a driving lever for rotating a slide contact of said encoder and a cam formed in said inner lens barrel for turning said driving lever when said inner lens barrel moves in said axial direction, said cam being so formed as to turn said driving lever through an angle which is larger in a range of focal length suitable for telephotography than in a range of focal length suitable for wide-angle photography.

7. A camera as defined in claim 1, further comprising an inner lens barrel driving mechanism for driving said inner lens barrel, said driving mechanism comprising a motor driven gear attached to said outer lens barrel, a rack attached to said inner lens barrel and a guide rod disposed along said rack.

8. A camera as defined in claim 7, wherein a lens shifting mechanism and said inner lens barrel driving mechanism are disposed close to each other and on opposite sides of said guide rod.

9. In a camera with a zoom lens system having a fixed outer lens barrel attached to a camera body, an inner lens barrel fitted in said outer lens barrel for axial and rotatable movement along and about the optical axis of said zoom lens system for changing the positions of front and rear lens means of said zoom lens system relative to each other, an operating barrel rotatably fitted on said outer lens barrel for rotating said inner lens barrel, and coupling means operatively interconnecting said inner lens barrel and said operating barrel for causing said axial movement of said inner lens barrel upon rotation of said operating barrel, thereby to change said relative positions of said front and rear lens means so as continuously to change the focal length of said zoom lens system, said camera body having a sprocket wheel for engaging a film in said camera; the improvement wherein said camera body has a sprocket chamber adjacent one side of an exposure aperture in said camera body, said sprocket chamber receiving said sprocket wheel and projecting forwardly from a plane in which said exposure aperture is formed, said outer and inner lens barrels having cutouts in their rear end portions for receiving said sprocket chamber.

10. In a camera with a zoom lens system having a fixed outer lens barrel attached to a camera body, an inner lens barrel fitted in said outer lens barrel for axial movement along the optical axis of said zoom lens system for changing the positions of front and rear lens means of said zoom lens system relative to each other, and means for causing said axial movement of said inner lens barrel thereby to change said relative positions of said front and rear lens means so as continuously to change the focal length of said zoom lens system, said camera body having a sprocket wheel for engaging a film in said camera; the improvement wherein said camera body has a sprocket chamber adjacent one side of an exposure aperture in said camera body, said sprocket chamber receiving said sprocket wheel and projecting forwardly from a plane in which said exposure aperture is formed, said outer and inner lens barrels having cutouts in their rear end portions for receiving said sprocket chamber.

* * * * *